(12) United States Patent
Stokking et al.

(10) Patent No.: US 8,296,815 B2
(45) Date of Patent: Oct. 23, 2012

(54) GENERATING A STREAM COMPRISING SYNCHRONIZED CONTENT

(75) Inventors: Hans Maarten Stokking, The Hague (NL); Omar Aziz Niamut, Vlaardingen (NL); Mattijs Oskar van Deventer, Leidschendam (NL); Fabian Arthur Walraven, Groningen (NL); Victor Bastiaan Klos, The Hague (NL); John Gerard Beerends, Hengstdijk (NL)

(73) Assignee: Koninklijke KPN N.V., The Hague (NL)

( * ) Notice: Subject to any disclaimer, the term of this patent is extended or adjusted under 35 U.S.C. 154(b) by 608 days.

(21) Appl. No.: 12/496,827

(22) Filed: Jul. 2, 2009

(65) Prior Publication Data

US 2010/0005501 A1    Jan. 7, 2010

(30) Foreign Application Priority Data

Jul. 4, 2008  (EP) ..................... 08012155

(51) Int. Cl.
*H04N 7/173* (2011.01)
(52) U.S. Cl. ......... 725/115; 725/127; 725/116; 725/131
(58) Field of Classification Search ............. None
See application file for complete search history.

(56) References Cited

U.S. PATENT DOCUMENTS

| | | | | |
|---|---|---|---|---|
| 7,853,342 B2 * | 12/2010 | Redmann | ........................ | 700/94 |
| 2003/0164084 A1 | 9/2003 | Redmann et al. | | |
| 2004/0152519 A1 | 8/2004 | Wang et al. | | |
| 2005/0056141 A1 | 3/2005 | Euhara | | |
| 2005/0140519 A1 | 6/2005 | Smith | | |
| 2005/0262542 A1 * | 11/2005 | DeWeese et al. | ............. | 725/106 |
| 2006/0146734 A1 * | 7/2006 | Wenger et al. | ................ | 370/260 |
| 2007/0098368 A1 | 5/2007 | Carley et al. | | |
| 2007/0140510 A1 | 6/2007 | Redmann | | |
| 2008/0279535 A1 * | 11/2008 | Haque et al. | .................... | 386/95 |

FOREIGN PATENT DOCUMENTS

| | | |
|---|---|---|
| EP | 0782338 A2 | 7/1997 |
| EP | 1734527 A1 | 12/2006 |
| WO | 0199413 A3 | 12/2001 |

OTHER PUBLICATIONS

Rauhala et al., "A new Feature for TV Programs: Viewer Participation Through Videoconferencing," Lecture notes in Computer Science, 3333:298-305 (2004).
Liu, "Image and video coding—A fast video mixing method," Lecture notes in Computer Science, 3656:320-327 (2005).
Rix et al., "Perceptual Evaluation of Speech Quality (PESQ) The New ITU Standard for End-to-End Speech Quality Assessment Part I—Time-Delay Compensation," J. Audio Eng. Soc., 50:755-764 (2002).

* cited by examiner

*Primary Examiner* — Brian Pendleton
*Assistant Examiner* — Cai Chen
(74) *Attorney, Agent, or Firm* — McDonnell Boehnen Hulbert Berghoff LLP

(57) ABSTRACT

A method of generating a stream comprising synchronized interactive content is described. The method comprises the steps of: transmitting a first stream from a studio to a terminal or a terminal system of a first user and to a buffer; transmitting in response to the first stream a second stream to a mixer connected to the buffer, the second stream comprising content generated in reaction to the content of the first stream; providing the mixer with a temporal relation between the packets in the first and second stream; generating a first output stream comprising a substantially synchronized content by mixing packets in second stream with packets of the buffered first stream on the basis of the temporal relation.

20 Claims, 9 Drawing Sheets

GENERATING A STREAM COMPRISING SYNCHRONIZED CONTENT

CROSS-REFERENCE TO RELATED APPLICATIONS

This application claims the benefit under 35 U.S.C. §119 (a)-(d) of European Patent Application EP08012155.1 filed on Jul. 4, 2008, which is hereby incorporated by reference.

FIELD OF THE INVENTION

The invention relates to generating a stream comprising synchronized content, in particular, though not exclusively, to a method and system for generating a stream comprising synchronized content for use in an interactive multimedia service, to a terminal or terminal system and to a video mixer for use in such system.

BACKGROUND OF THE INVENTION

New multi-media techniques such as Voice over IP (VoIP) and the Internet Protocol Television (IPTV) open a whole range of new multi-media services. One type of services enables viewers at home to participate in a television broadcast wherein the participant's input, which is fed back to the broadcaster, may change or influence the program in which the participant participates.

An example of such an interactive service may be an interactive karaoke show, wherein viewers at home may participate and interact with the show at the studio location. Typically such interactive service comprises a television signal comprising e.g. the music played by an orchestra at the studio location and the subtitles for presenting the text of the song on the television screen of the participating viewer. The television signal from the studio is sent via a network to a home-located terminal, e.g. a set-top box or the like, of a participating viewer and displayed by the television set of the viewer, which is connected to the terminal. The viewer may interact with the content of the television signal from the studio by using audio-video recording equipment connected to the terminal allowing the viewer to record his or her performance and to send the user signal back to the studio. A further example of an interactive television service may be home-located viewers participating in a live television quiz such that the quiz program may change on the basis of the answers of the participating viewers.

Due to the limitations of the feedback channel (i.e. the return path through which the participant's input is fed back to the broadcaster) current viewer participation in television broadcasts is limited. One example is a television program which allows a webcam signal or a text-message of a home-located viewer to appear "on screen" in a television program. No real interaction with the program content is possible. Another example of viewer participation is a television show, which allows a viewer to participate through a telephone. A telephone line has little delay and thus allowing almost real-time interaction with the studio. However, because its limited bandwidth a telephone line is only suitable for audio signals and thus not suitable for visual interactivity.

A more advanced example of viewer participation is described in an article by Rauhala et al ("*A New Feature for TV Programs: Viewer Participation Through Videoconferencing*", Lecture notes in Computer Science, Vol. 3333, 2004, pp. 298-305). The authors propose the use of a videoconferencing server for processing a video signal of a participating viewer in combination with a video mixer. The mixer mixes the signal of the participating viewer with the studio signal carrying the television program signal into a single output signal. Problems related to the quality of the signal and delays were reported.

Implementation of true viewer participation in an interactive broadcast—in the sense that the participating home-located viewers and the studio-located viewers experience audiovisual interaction with each other—introduces certain problems within the context of IPTV. One problem relates to the synchronization of streams in the interactive broadcast. It is essential that the content of the television studio signal and the content of the home-recorded signal of a participating viewer are synchronized. The synchronized content of both signals may be transmitted back to the studio where it may be used as an input signal for the interactive broadcast.

In an IPTV environment however, where the broadcast signals are transmitted as steams over one or more networks, network delays are inevitably present. During an interactive TV broadcast session packetized streams are transmitted back and forth between the participating viewer and the studio over one or more networks. These streams will be subjected to unknown delays, which are caused by various sources in the network, such as transmission delays, delays due to differences in network routes and coding- and decoding delays, etc. As a consequence, the temporal relationship between the packets in the streams of the interactive broadcast, in particular the streams sent from the broadcaster to the home-located participants and the streams sent by the home-located participant back to the broadcaster, may be disturbed thereby seriously degrading the interactive service.

A further problem relates to the quality of the television signals in the interactive broadcast. The quality is defined in the various television broadcast standards, including de high quality standards like HDTV and EDTV. As a consequence, offering high quality interactive services will require the use of high quality video mixers.

Mixing high quality broadcast streams however, is a relatively time consuming process, which may take in the order of magnitude of seconds. Such mixing delays may thus provide a significant contribution to the total delay the streams in the network are subjected to. Hence, mixing of high quality broadcast streams negatively influence the synchronization of the streams in the interactive television broadcast.

SUMMARY OF THE INVENTION

It is an object of the invention to reduce or eliminate at least one of the drawbacks known in the prior art. In a first aspect the invention may related to a method of generating a stream comprising synchronized interactive content. The method may comprise the steps of: transmitting a first stream from a studio to a terminal or a terminal system of a first user and to a buffer; transmitting in response to the first stream a second stream to a mixer connected to the buffer, the second stream comprising content generated in reaction to the content of the first stream; providing the mixer with a temporal relation between the packets in the first and second stream; and, generating a first output stream comprising a substantially synchronized content by mixing packets in second stream with packets of the buffered first stream on the basis of the temporal relation. In variant, the method may further comprise the step of transmitting said first output stream back to the studio, wherein said first output stream is used by said studio as an input signal for said interactive television service.

By using the temporal relation between the signal of the studio, i.e. the signal which comprises the content to which the viewer at home responds to, and the signal generated by the user participating in the interactive service, the streams can be mixed in such a way that the content in the mixed signal is substantially synchronized. The method therefore eliminates or at least substantially reduces the undesirable effects caused by delays, including mixing delays, in the network. As a consequence, the method allows the use of high quality mixers. Moreover, the method provides a simple method which does not require expensive equipment at the user location.

Further, the invention may relate to a method of generating a stream comprising synchronized content for use in an interactive media or television service. The method may comprise the steps of: a transmitter transmitting a first stream over a network to a terminal or a terminal system of a first user and transmitting a copy of said first stream to a buffer connected to a first input of a first mixer; upon receipt of said first stream, said terminal or terminal system generating a second stream, said second stream comprising content generated in reaction to the content of the first stream; transmitting said second stream over a network to a second input of said first mixer; providing the first mixer with a temporal relation between the packets in the first and second stream; and, said mixer generating a first output stream comprising a substantially synchronized content by mixing packets in second stream with packets of the first stream in said buffer on the basis of said temporal relation, said first output stream being used as an input signal for said interactive media or television service.

In an embodiment the temporal relation may be defined by mapping information relating a first packet in the first stream comprising first timing information to a second packet in the second stream comprising second timing information. In another embodiment the first and second timing information may comprise time-stamp information. In this embodiment the temporal relation between the interactive streams is based on timing information in the streams, e.g. a Program Clock Reference in a MPEG transport stream, a Presentation Time-Stamp in an MPEG elementary stream or a time-stamp in the RTP header in an RTP stream. On the basis of the timing information mapping information can be determined providing a very accurate temporal relation between the first and second stream.

In an embodiment the method may comprise the step of providing the terminal and the mixer with a predetermined mapping scheme. Using a predetermined mapping scheme does not require transmission of mapping information from the terminal to the mixer. In yet another embodiment the terminal or the terminal system may determine the mapping information on the basis of the first and second timing information and transmitting the mapping information in a mapping signal to the mixer.

In one embodiment the method may comprise the steps of: associating a second packet in the second stream with a first packet in the first stream on the basis of the mapping information; and, mixing the first packet with the second packet. In another embodiment the method may further comprise the step of: associating a second packet in the second stream with a first packet in the first stream on the basis of the mapping information; calculating a first buffer delay on the basis of a first arrival time of the first packet in the first stream arriving at the input of the buffer and a second arrival time of the second packet in the second stream arriving at the input of the mixer; and, mixing the first stream with a time-delayed second stream, wherein the time-delay is based on the calculated first buffer delay.

Using a combination of the mapping information and information on the arrival time of packets in the first and second stream a buffer delay can be determined. Hence, this embodiment allows the use of a simple time delay buffer.

In one embodiment the temporal relation may be determined on the basis of the time delay between the dispatch by the studio of a first packet in the first stream and the receipt by the mixer of a second packet in the second stream, the second packet being transmitted by the terminal in response to the first packet and on the basis of the time delay between the dispatch by the studio of a copy of the first packet and receipt by the first mixer of that packet. In this embodiment the time delay is used to configure a variable time delay buffer. Using the time delay the mixer is able to mix the second stream with a time-delayed first stream so that the content of the mixed output signal is substantially synchronized. This implementation does not require adaptation of the terminals and is therefore easy to implement in systems which use legacy terminals.

In a further embodiment the temporal relation may be determined on the basis of the time delay between a predetermined audio signal transmitted in the first stream to the terminal or the terminal system and an associated audio signal transmitted in the second stream to the mixer. In this implementation the round-trip time of a predetermined audio signal is taken in order to determine the time delay. This embodiment only requires an acoustic delay calculation unit and the use of a simple time delay buffer. No special adapted terminals and mixers are required.

In yet a further embodiment the method may further comprise the steps of: generating a time-delayed first stream by providing the time delay to the buffer; and, mixing the second stream with the time-delayed first stream.

In another embodiment the method may further comprise the step of transmitting the first output stream to one or more terminals of users viewing the interactive broadcast.

The invention may be easily extended to multiple participating users. To that end, the method may further comprise the steps of: transmitting the first output stream to a second terminal or terminal system of a second user and the second stream to a second buffer; the second terminal transmitting in response to the first output stream a third stream to a second mixer, the third stream comprising content generated in reaction to the content of the first output stream; providing a second temporal relation between packets in the first output stream and packets in the third stream; and, mixing the first, second and third stream to a second output stream according to the second temporal relation.

In another embodiment for multiple participating users, the method may further comprise the step of: transmitting the first stream to a number of terminals or terminal systems and to a second video mixer, preferably a fast video mixer, more preferably a video Multipoint Control Unit (MCU); generating a second output stream by mixing the first stream with the streams transmitted by the terminals in response to the first stream; and, transmitting the second output stream to the terminals and to the first mixer. This embodiment allows simultaneous interaction of all participants in the session.

In a further aspect, the invention may relate to a system for generating a stream comprising synchronized interactive content. The system comprises: a studio for transmitting a first stream; a terminal or a terminal system of a first user for receiving the first stream; means for transmitting in response to the first stream a second stream, the second stream comprising content generated in reaction to the content of the first stream; means for providing a temporal relation between packets in the first stream and packets in the second stream; and, a video mixer for generating a first output stream comprising a substantially synchronized content by mixing packets in the second stream with packets of the buffered first stream according to the temporal relation.

In yet a further aspect the invention relates to a terminal, preferably a set-top box, or terminal system for use in a system as described above. The terminal or terminal system comprises: means for receiving a first stream; means for transmitting in response to the receipt of the first steam a second stream; and, a timing control unit for providing mapping information, the mapping information providing a temporal relation between a first packet in the first stream and second packet in the second stream.

In another aspect the invention relates to a video mixer for use in a system as described above. The mixer comprises: means for receiving a buffered first stream and a second stream; means for providing a temporal relation between a first packet in the buffered first stream and second packet in the second stream; and, means for generating an output stream comprising a substantially synchronized content by mixing packets in second stream with packets of the buffered first stream on the basis of the temporal relation.

The invention will be further illustrated with reference to the attached drawings, which schematically will show embodiments according to the invention. It will be understood that the invention is not in any way restricted to these specific embodiments.

DETAILED DESCRIPTION

Figure 1:
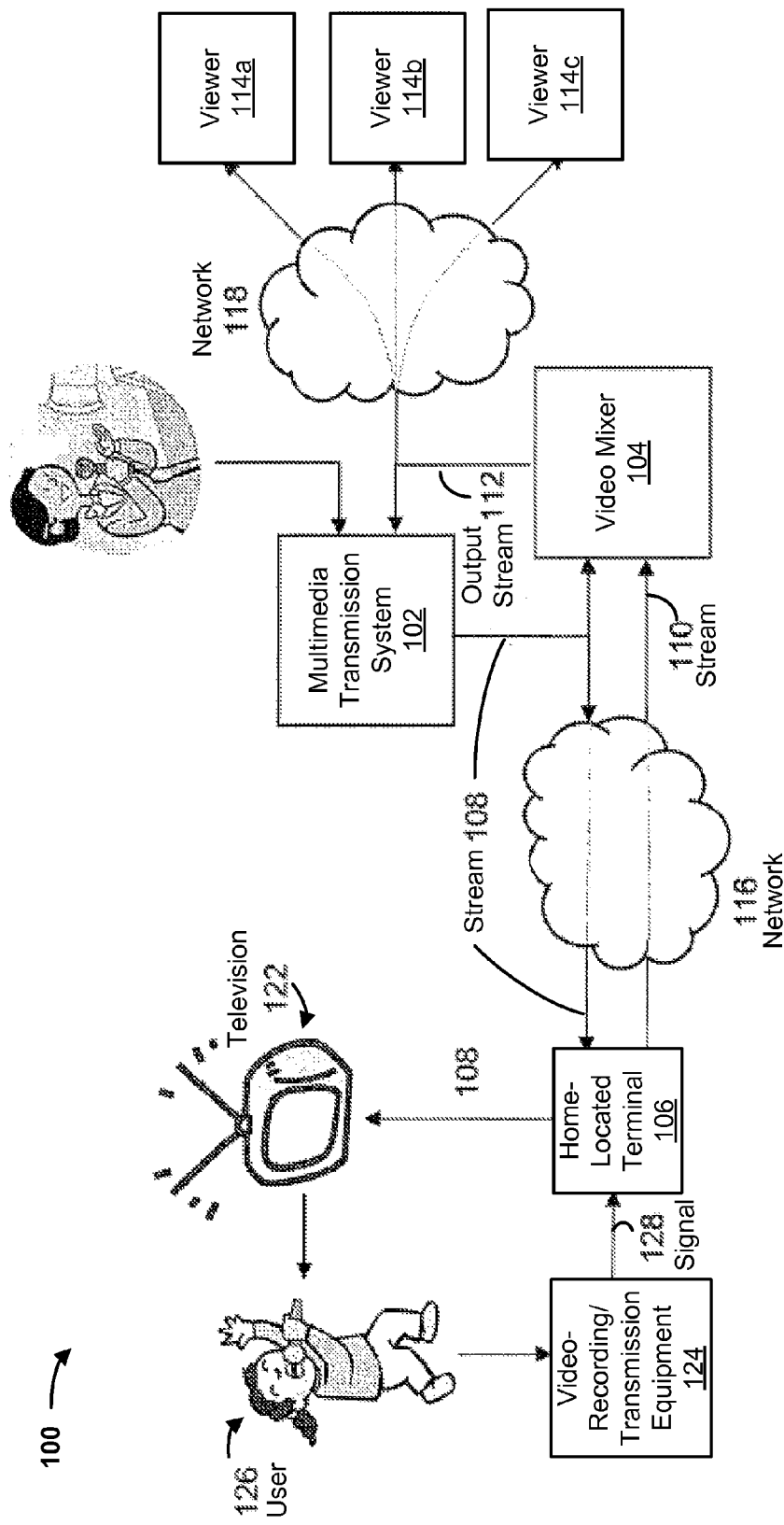
FIG. 1 depicts a schematic of a system for providing interactive broadcast services known from the prior art.

FIG. 1 illustrates a schematic of a system 100 generating a stream comprising interactive content known from the prior art. The system, which is capable of providing interactive broadcast services to one or more participating users, comprises a multimedia transmission system 102, e.g. a studio capable of producing a television broadcast signal and/or a multimedia server in the network, a video mixer 104 and a home-located terminal or a home-located terminal system 106 of a participating user.

A studio 102 may be generally defined as any installation or system configured for producing a television signal and/or a multimedia signal. The studio may comprise one or more content servers, recording equipment and/or transmission equipment, e.g. a head-end, configured for transmitting the recorded content to the terminals. The video mixer 104 mixes the various streams 108,110, typically multimedia streams, in the interactive broadcast into one output stream 112, which is transmitted back to the studio and—via one or more circuit switched and/or packet switched networks 116—to the terminals of the other non-participating viewers 114a-114c. The mixer is typically located at the studio site. The studio may be further connected to a broadcast station (not shown) for transmitting the signal from the studio in a first stream 108 over one or more circuit switched and/or packet switched networks 116 to the home-located terminals of one or more participating viewers.

The terminal 106 may be a set-top box connected to a television set 122 and to the network. In order to provide audiovisual interactivity the terminal may be comprise audio-video recording and/or transmission equipment 124 for recording a user signal and transmitting the signal back to the studio. In other embodiments, the terminal may be an integrated multimedia system, e.g. a multimedia computer, a personal digital assistant (PDA) or any other multimedia device capable of receiving, displaying and/or recording streams and transmitting in response to these streams a user-generated stream to the mixer and the studio. Alternatively, the multimedia system may comprises separate components, e.g. a set-top box connected to the network and to a display terminal for viewing the content in the first stream and a separate multi-media computer connected to the network for recording a user-signal and transmitting this user-generated signal in a stream to the mixer and the studio. The components in the multimedia system may use a wireless connection (e.g. Bluethooth or the like) for communication.

The user 126, viewing the content of the first stream, may interact with a first stream 108 comprising the studio signal by using the audio-video recording equipment 124 connected to set-top box 106. The recorded user-generated signal 128 is transmitted in a second stream 110 from the terminal of the participating viewer back to the mixer at the studio location.

The mixer mixes the second stream 110 with the first stream 108 into an interactive output stream 112, which comprises both the studio signal and the signal of the participating user. This output signal is subsequently transmitted to all other non-participating viewers and back to the studio. To that end, the studio comprises a studio receiver, which may receive the output stream and use it as an input for an interactive broadcast service.

The steams comprising the signals of the studio and/or user may be transported over the network using well known protocols. The streams may be e.g. MPEG transport streams comprising audio and video elementary streams or RTP packetized MPEG transport streams with elementary streams or plain RTP streams.

Figure 2:
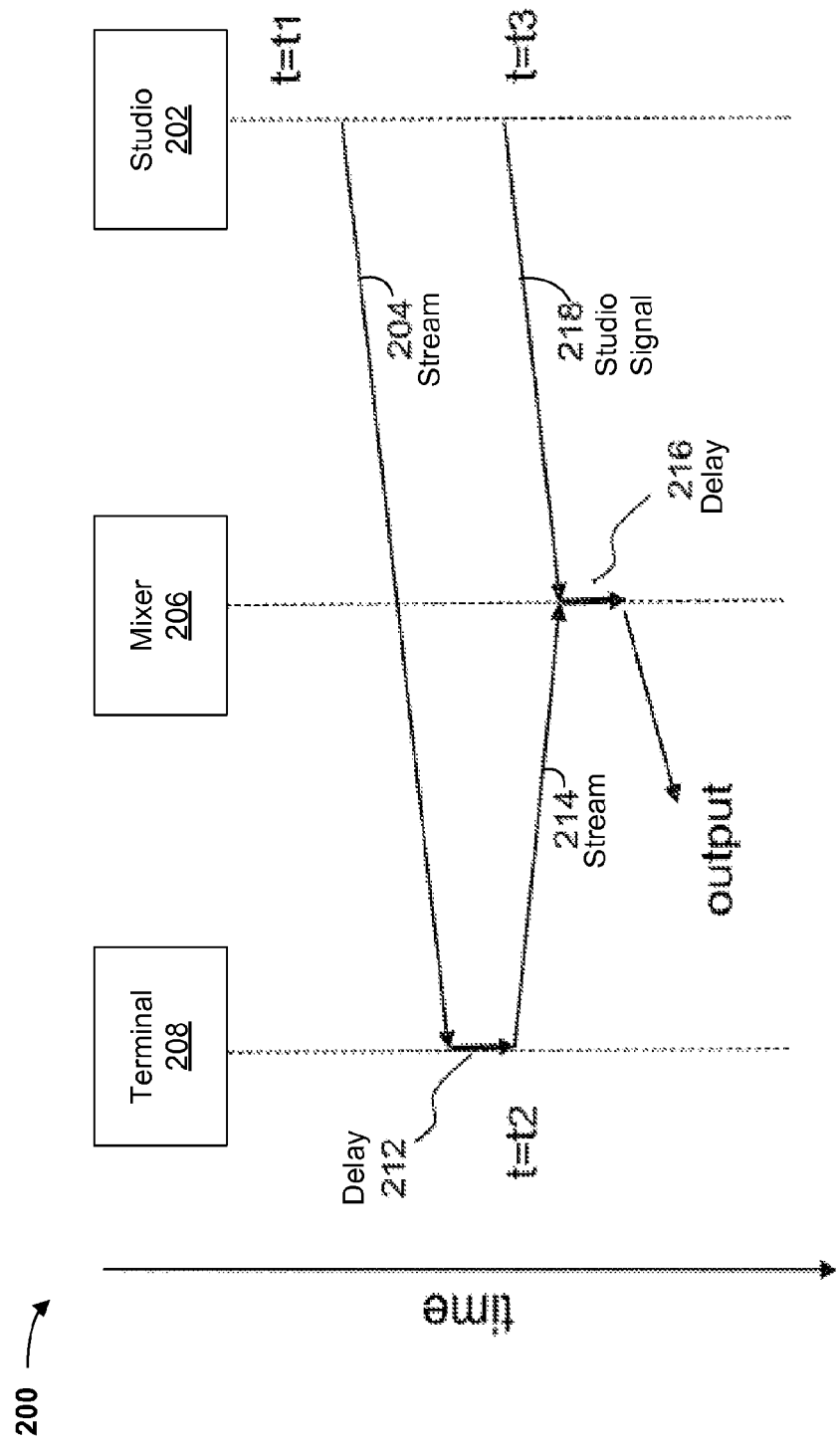
FIG. 2 depicts a schematic time-flow diagram of the streams in a system known from the prior art.

FIG. 2 depicts a schematic time-flow diagram of the streams in a system according to FIG. 1. The studio 202 sends at a first point in time t=t1 the first stream 204 over a network to the terminal or the terminal system 208 of the participating user. Due to various sources in the network and the terminal or terminal system, delays will be introduced in the stream. For example, at the studio location 202 the capturing, encoding and packetizing of the recorded signal will introduce recording and transmission delays. At the mixer location 206 mixing delays 216 will be introduced due to mixing process which typically takes place in the decompressed domain. Hence, the mixing delay will comprise delays due to buffering, decoding, the actual mixing, encoding and packetizing. Similarly, at the terminal location 208 receiver-, display- and transmission delays 112 will be introduced. When the mixer is located close to the studio, the delays in the path from the studio to the mixer and vice versa are typically much smaller than the delays introduced by the sources further down the path of the streams (i.e. between the mixer and the terminal).

Due to these delays 212 the user will interact at a second point in time t=t2 (t2>t1) with the first stream, which was sent from the studio at t=t1. As a consequence, the second stream 214 comprising the user interaction with a television signal of t=t1 will be mixed with a stream comprising a studio signal 218, which was sent at a later point of time t=t3 (t3>t1) from the television studio to the mixer. The content of the mixed output signal is therefore not synchronized. Hence, the output signal may not be used as a suitable input signal for use by the studio in an interactive television service or as output signal to be sent to the other participating and non-participating viewers.

Figure 3A:
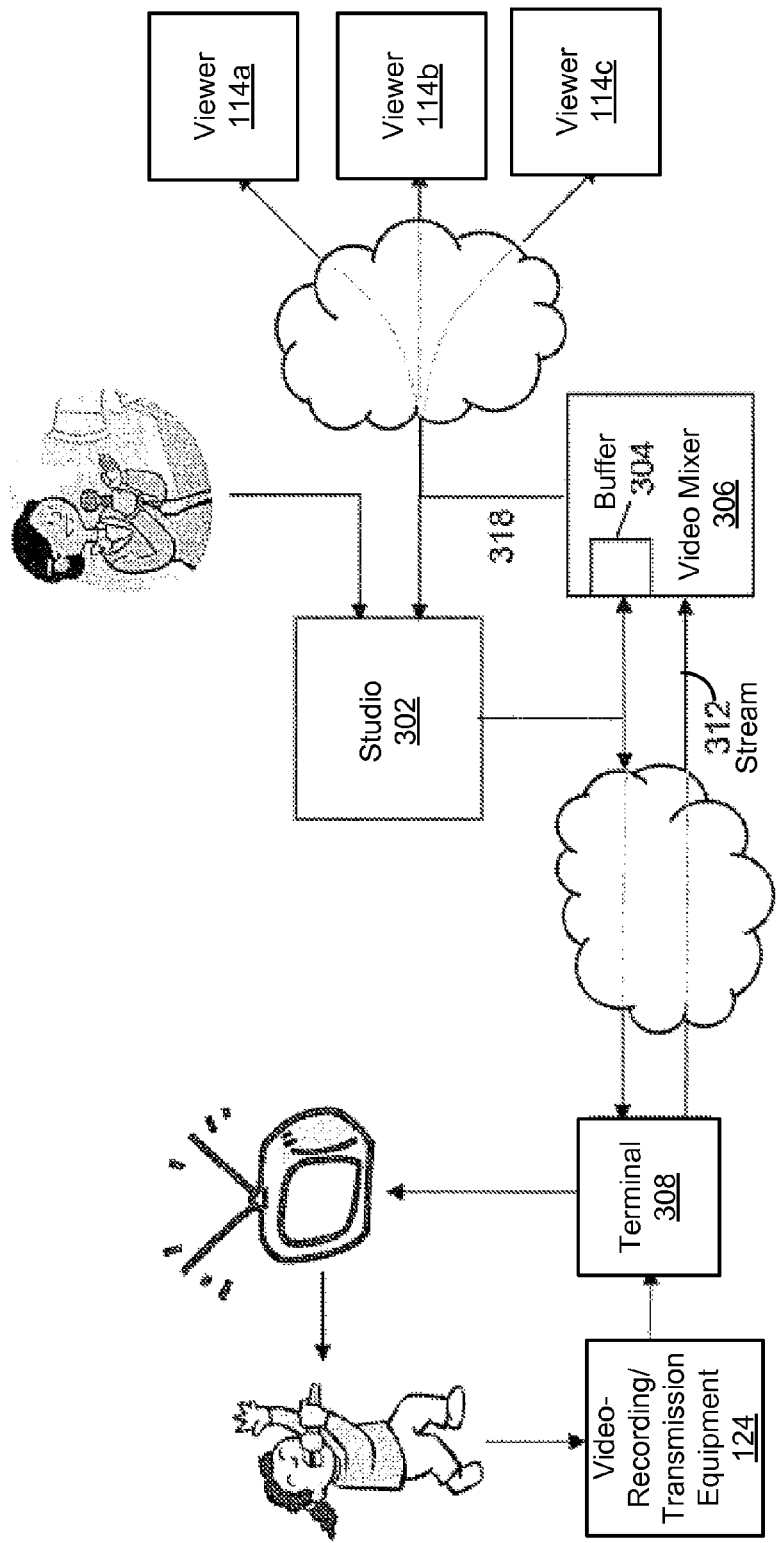
FIGS. 3A and 3B depict a system according to one embodiment of the invention and a schematic time-flow diagram of streams transmitted in such system.

FIG. 3A depicts a system according to one embodiment of the invention. The system is configured for providing an interactive television service and comprises a studio 302, a video mixer 306 and a terminal or a terminal system 308 of a user participating in the interactive broadcast similar to the system as depicted in FIG. 1. A buffer 304 for buffering streams originating from the studio is connected to a first input of the mixer. The buffer may be located close to or in the mixer. The buffer may be a variable time delay buffer. Such buffer may have an input for receiving delay information from an external source. On the basis of the received delay information, the buffer may produce a time-delayed output signal.

Figure 3B:
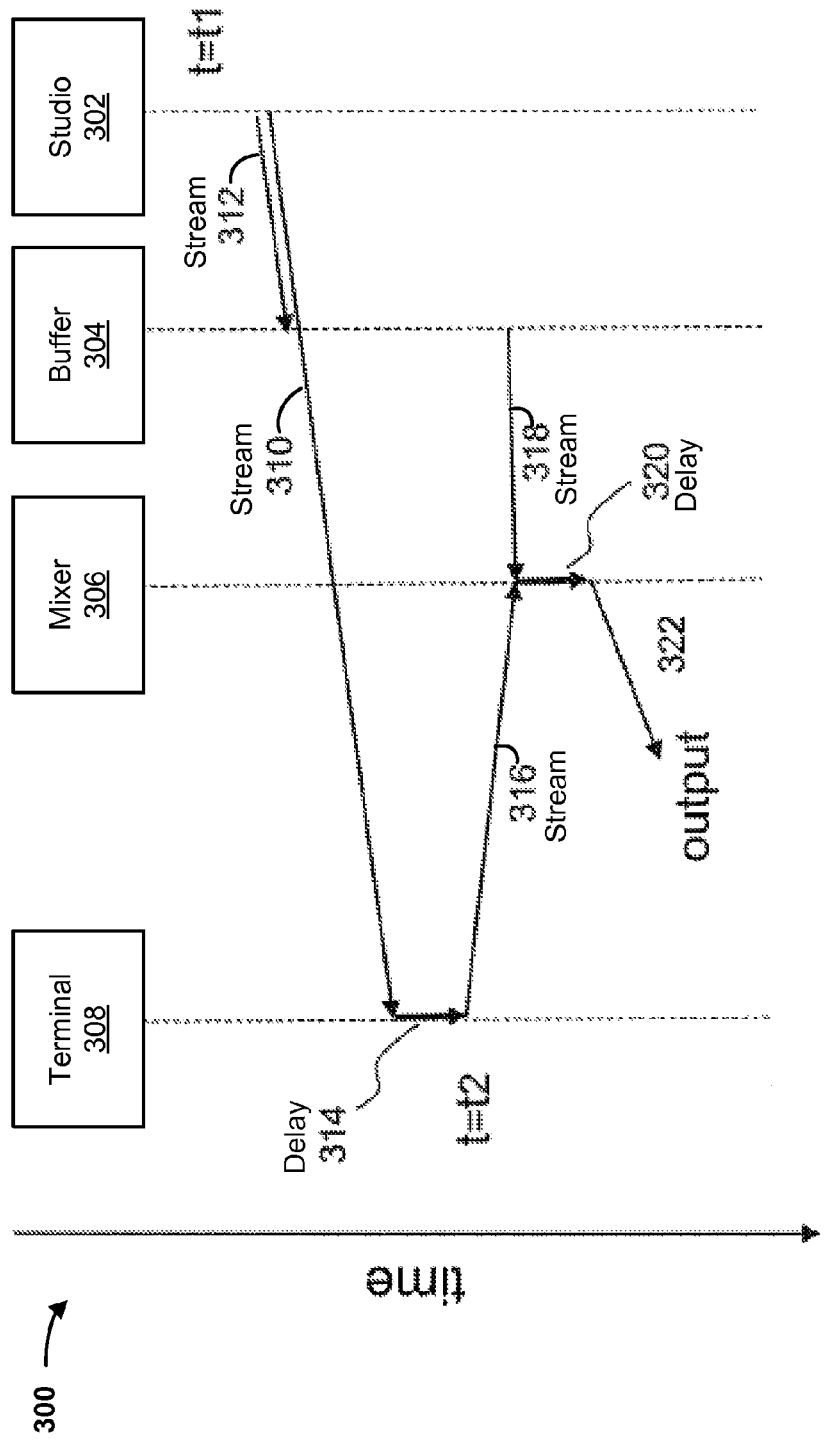

FIG. 3B depicts a schematic time-flow diagram 300 of the streams in a system as depicted in FIG. 3A according to one embodiment of the invention. First, the studio transmits at a first point in time t=t1 a first stream 310 over one or more networks to the terminal 308 of the participating user. At the same time, the studio transmits a copy of the first stream 312 to the buffer. Duplication of the first stream may be realized by a stream duplicator located in the studio, the mixer or in the network (not shown).

In response to the receipt of the packets of the first stream 310, the terminal will transmit at a second point in time t=t2 packets comprising user-generated content in a second stream 316 to a second input of the mixer. Thereafter the mixer will mix the packets from the second stream with packets from the buffered first stream 318. In order to compensate for the delays 314,320 caused by various sources in the network, such as transmission delays, delays due to differences in network routes and coding- and decoding delays, the mixer will have to mix the second stream transmitted at t=t2 from the home-located terminal with the buffered first stream transmitted at t=t1 from the studio.

Hence, as the participating user interacts with the content of a packet from the first stream 310 and subsequently reacts to the content in this packet. By sending the user-generated signal in packets in a second stream 312 to the mixer, a predetermined temporal relation between the first and second stream exist. This temporal relation is used by the mixer in order to combine the second stream 312 with the buffered first stream 318 in such a way that the content in the mixed output signal is substantially synchronized. The output signal 320 comprising the synchronized content is sent to the participating and non-participating viewers and fed back to the studio, where the user-generated content, e.g. an answer to a quiz question, is used as an input for the interactive television service thereby determining or influencing the content subsequently send in the first stream to the terminals.

It is understood that a packet in a stream may refer to any formatted block of information carried in a stream send over a network. A packet may comprise control information and user data. The control information provides the network information needed to deliver the user data, e.g. source and destination addresses, error detection codes and sequencing- and timing information. Further, the user data, i.e. the content generated by the user using his terminal or terminal system, and the studio data, the content generated at the studio, may comprise any kind of information, including multimedia data. A packet may comprise video information e.g. in the form of a video frame. A packet may also comprise audio and/or text information or combinations thereof such as a multimedia packet comprising a video signal with a corresponding audio signal and corresponding subtitle information.

The temporal relation between the packets in the first and second stream may be provided in various ways.

Figure 4:
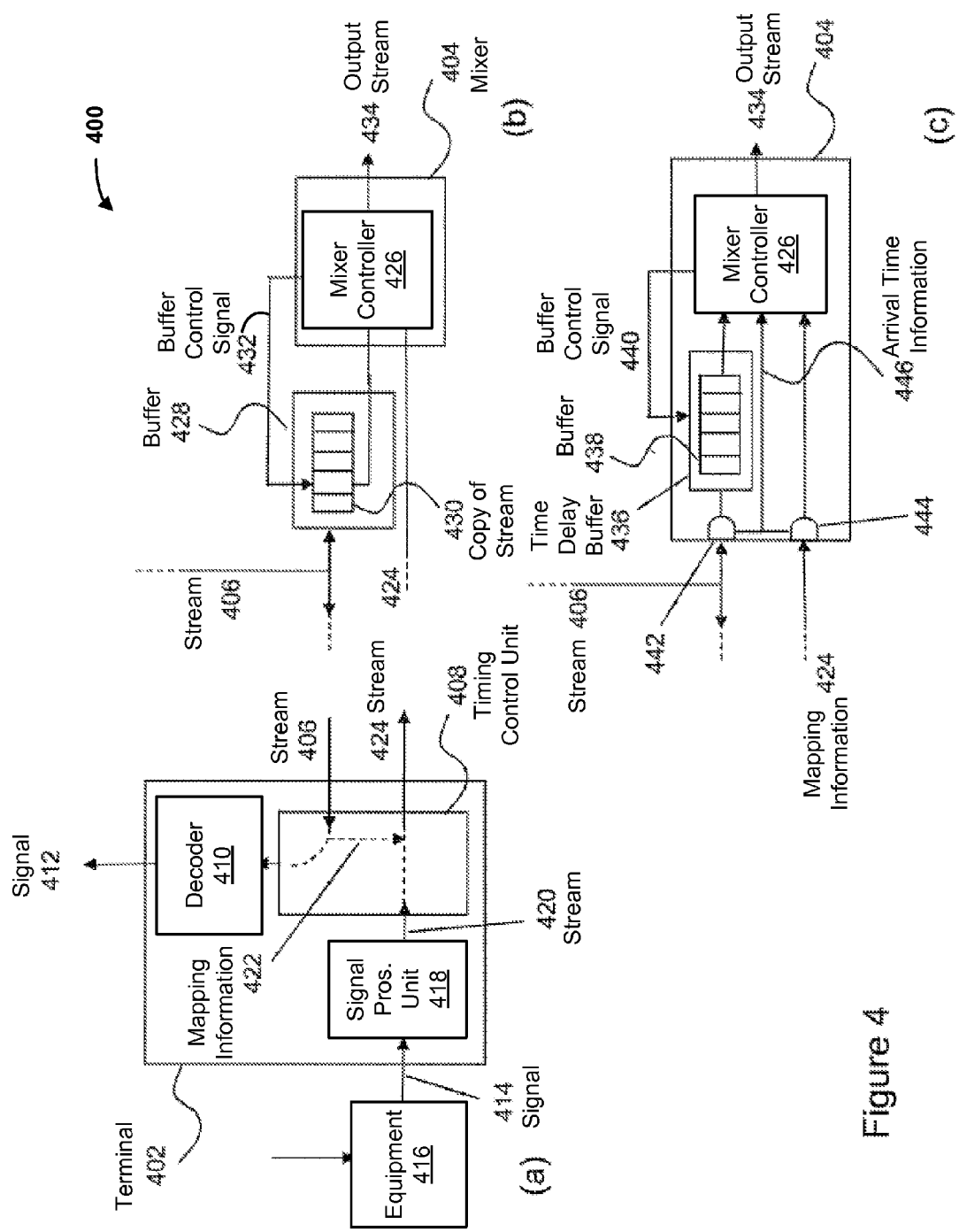
FIG. 4 depicts embodiments of inter-related terminal-mixer configurations.

FIG. 4 depict possible configurations of an inter-related terminal/mixer pair 400 for use in an interactive broadcast system according to one embodiment of the invention. The terminal 402 is capable of reading and processing the timing information of a stream. The timing information in the streams may be time-stamps. Time-stamps are used by the MPEG protocol in order to synchronize the elementary streams in a MPEG transport stream. Similarly, the RTP protocol uses time-stamps to "lip-sync" the separate audio and video RTP streams. On the basis of the timing information mapping information may be derived. The mapping information relates a packet in the first stream to a packet in the second stream.

In one embodiment the mapping information may be provided by a predetermined mapping scheme which is implemented in the terminal and the mixer 404. In another embodiment, the mapping information may be determined by the terminal, which is capable of transmitting the mapping information in a mapping signal to the mixer.

In the terminal 402 as schematically illustrated in FIG. 4(a), the first stream 406 from the studio is received by a timing control unit 408 in the terminal. The stream is subsequently fed into a decoder 410 for transforming the studio stream into a signal 412 suitable for the display unit, e.g. a television set or a (mobile) media player or the like. The timing control unit 408 is capable of reading timing information, such as transmission protocol (e.g. MPEG or RTP) time-stamps, from the first stream.

In response to the displayed content, the participating user generates a user signal 414 using the audio-video recording equipment 416 connected to the terminal. The user signal is fed into a signal processing unit 418 of the terminal for transforming the user signal into an encoded packetized stream 420, which is transmitted to the timing control unit 408. The timing control unit may comprise a mapping function which uses the preconfigured mapping scheme, e.g. by inserting a copy of a time-stamp from a packet in the first stream, into the stream comprising the user-signal thereby forming a second stream 424 which is subsequently transmitted to the mixer 404.

In a further embodiment, the timing control unit is also capable of reading timing information from the second stream. The timing control unit reads a first packet having a first time stamp from the first stream and associates this time-stamped packet with a second packet having a second time-stamp from the second stream. The relation between the first and second packet defines mapping information 422 which may be sent in a separate mapping signal to the mixer.

One embodiment of a mixer is schematically illustrated in FIG. 4(b). The mixer is connected to a buffer 428 which contains a copy 430 of part of the first stream 406. Further, the mixer comprises a mixer controller 426, which is configured to control the buffer the buffer. The mixer controller is capable of processing packets in the second stream and the packets in the first stream stored in the buffer on the basis of the mapping information. This mapping information may be sent to the mixer as time-stamp information in the second stream or as a separate mapping signal.

The mixer controller relates an incoming packet in second stream with second time stamp to a packet in the first stream with a first time stamp on the basis of pre-configured mapping information. Thereafter, the mixer controller sends a buffer control signal 432 to the buffer 428 in order to instruct the buffer to send a packet identified by time-stamp information from the buffer to the mixer. Alternatively, the mixer controller may receive mapping signal which relates a packet in second stream with second time stamp to a packet in the first stream with a first time stamp.

The packet from the first and second stream will be subsequently mixed into an output stream. In this embodiment, the buffer is capable of identifying packets in the buffered first stream on the basis mapping information, e.g. time-stamp information in the second stream.

Another embodiment of a mixer is schematically illustrated in FIG. 4(*c*). In this embodiment the mixer comprises a time delay buffer 436. The mixer further comprises means for determining a first arrival time 442 of a packet in the first stream arriving at the input of the buffer and means for determining 444 a second arrival time of a packet in the second stream arriving at the input of the mixer controller. The first and second arrival time information 446 are subsequently sent to the mixing controller. Using the mapping information 424 and the first and second arrival time, the mixer controller 426 may determine the total buffer delay necessary for synchronization. This buffer delay is sent in a buffer control signal 440 to the buffer 438 in order to instruct the buffer to send a time-delayed first stream to the mixer controller. Mixing the time-delayed first stream with the second stream will result in a substantially synchronized output steam 434. This embodiment provides the advantage that the processing of the timing information for use in the synchronization is done by the mixer.

Hence, mixing the packets in the second stream 424 with packets in the buffered first stream 430 on the basis of the mapping information will provide an output stream 442 comprising a substantially synchronized content.

Figure 5:
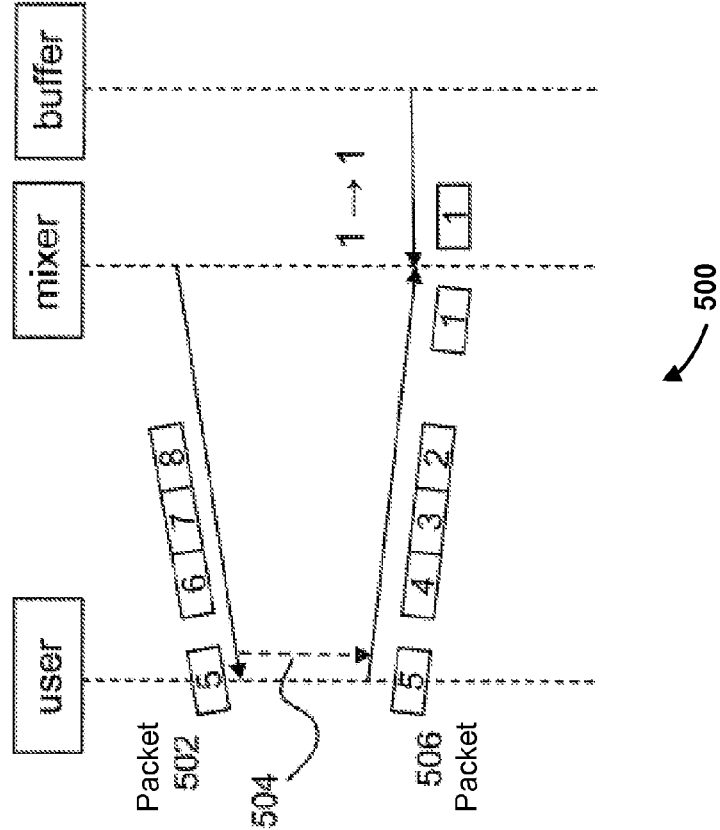
FIG. 5 depicts an embodiment using mapping information.

FIG. 5 schematically depicts a schematic time-flow diagram of an embodiment 500 which uses a predefined mapping scheme which is preconfigured in the terminal/mixer pair. This timing information may be in the form of transmission protocol (e.g. MPEG or RTP) time-stamps in the first stream. In the embodiment of FIG. 5, the timing control unit of the terminal reads the timing information, e.g. a MPEG or RTP time-stamp, of an incoming packet 502 from the first stream. Using the timing information and the mapping information, the time-stamp of the outgoing packet is determined. The timing control unit subsequently inserts this time-stamp, which may be e.g. a copy of the time-stamp of the incoming packet, into the outgoing packet 506 in the second stream. In this way a one-to-one temporal relation between the first and second stream exists: each time-stamped packet in the first stream has a corresponding time-stamped second packet in the second stream.

Upon reception of a packet in the second stream by the mixer, the mapping analyzing function in the mixer controller uses the predetermined mapping scheme in order to determine the corresponding packet in the buffered first stream. Thereafter, the mixer controller instructs the buffer to send this packet from the buffered first stream to the input of the mixer controller. These packets are subsequently mixed by the mixer controller into an output signal wherein the content is substantially synchronized.

Figure 6:
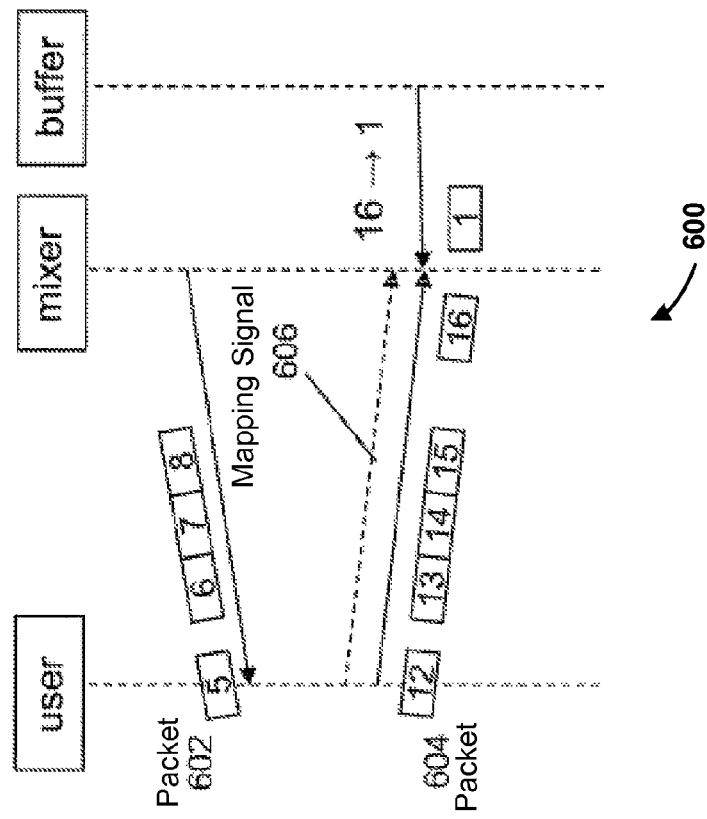
FIG. 6 depicts another embodiment using mapping information.

FIG. 6 illustrates a schematic time-flow diagram of another embodiment using timing information. In this embodiment the timing control unit makes use of the transmission protocol (e.g. MPEG or RTP) time-stamps present in both the first and the second stream. The timing control unit of the terminal reads both the time-stamp of an incoming packet 602 from the first stream and the time-stamp of the outgoing packet in the second stream 604, wherein the outgoing packet in the second stream is sent by the terminal in response to the receipt of a displayed packet in the first stream. The pairs of time-stamps read by the timing control unit provide a one-to-one temporal relation between the first and second stream and may be sent by the terminal in a separate mapping signal 606 to the video mixer.

The mixer controller receives the mapping information and retrieves on the basis of the mapping information a packet with a predetermined time-stamp from the buffered first stream. The retrieved packet from the first stream and the associated packet in the second stream are subsequently mixed into an output stream wherein the content is substantially synchronized.

In another approach, the temporal relation between the first and second streams may be provided by information on the time delay between the dispatch by the studio of a first packet in the first stream and the receipt by the mixer of a second packet, wherein the second packet is transmitted by the terminal in response to the first packet and the time delay between the dispatch by the studio of (a copy of) a first packet in the first stream and receipt by the mixer of that packet.

The time delay within an interactive broadcast session can be determined because all sources of delay are known or measurable. Delays caused by buffers, encoders and decoders are fixed and known or may be determined upfront. Moreover, the transport delays can be measured on the basis of known techniques such as the "ping" network tool. To that end, the timing control unit 422 of the terminal 402 may comprise—instead of a mapping function as described in relation with FIG. 5(*a*)—a second transport delay measuring function for measuring the time delay in the second stream. This transport delay measuring function may be e.g. capable of sending ICMP "echo request" packets to the mixer and listening for ICMP "echo response" replies originating from the mixer. The transmission delay for the second stream may be derived from the ICMP response and may be transmitted by the timing control unit to the mixer.

In the same way, the mixer control unit in the mixer may comprise—instead of a mapping analyzing function as described in relation with FIG. 5(*b*)—a first transport delay measuring function for measuring the transmission delay of the first stream. After measuring the transmission delays of the first and second stream, the mixer controller may determine the total delay in the network by adding the transport delays to the fixed, predetermined buffer-, encoding- and decoding delays. The mixer controller subsequently sends the calculated delay the buffer, which in this embodiment comprises a variable time delay unit for providing a time-delayed signal. Mixing the second stream with the time-delayed buffered first stream results in an output stream wherein the content is substantially synchronized.

Figure 7:
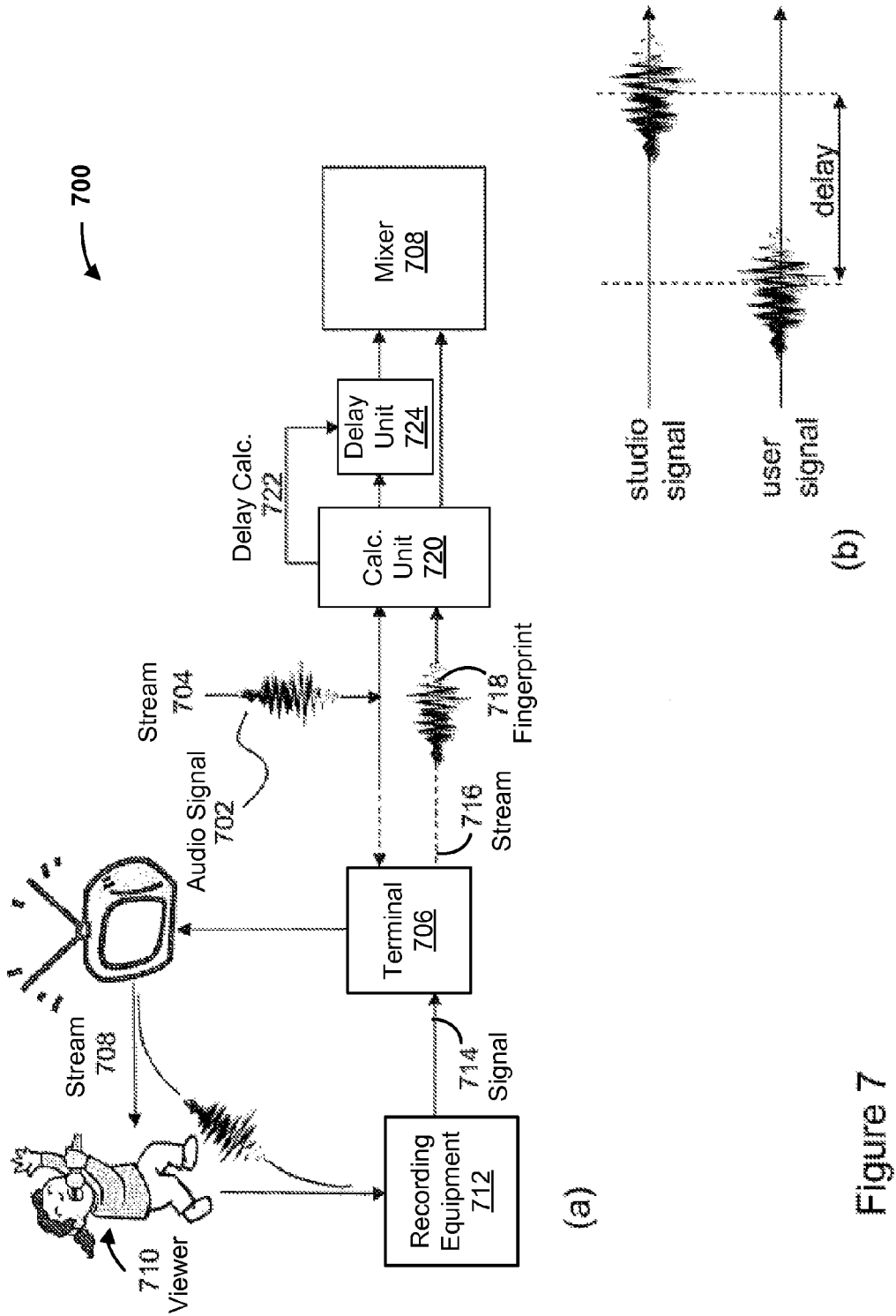
FIG. 7 depicts an embodiment using a delay estimation technique.

In another embodiment, the delay may be measured on the basis of techniques known from echo cancelling in telephone system. Such techniques are described in the article of Rix et. 1. ("PESQ, the new ITU standard for objective measurement of perceived speech quality, Part 1—Time alignment," J. Audio Eng. Soc. 2002, vol. 50, pp. 755-764). This embodiment 700 is schematically illustrated in FIGS. 7(*a*) and (*b*). A predetermined audio signal 702 in the first stream 704 is sent from the studio to the terminal 706 of the participating user and to the mixer 708. The content in the first stream 708 is presented to the participating viewer 710. In response, using the audio-video recording equipment 712 the viewer records a user signal 714, which will not only comprise the audio signal of the participating viewer but also the audio signal of the television of the participating viewer. Hence, the second stream 716 transmitted to the mixer comprises a "fingerprint" 718 of the audio signal in the first stream.

The first stream and the second stream are fed into an acoustic delay calculation unit 720 for matching the audio signals in both streams. The time delay between the audio signal in the first and second stream will be a measure of the total delay experienced by the first and second stream in the interactive broadcast. This is schematically shown in FIG. 7(b).

The delay calculation unit 720 subsequently sends the calculated delay 722 to a buffer comprising a variable delay unit 724. This embodiment has the advantage that the delay calculation is performed by a acoustic delay calculation unit, which can be installed in the system as a separate functional unit.

The embodiments based on the time delay calculation as described in relation to FIGS. 6 and 7 have the advantage that the method is simple and cost effective as the implementation of the delay transport delay measuring functions does not require serious modifications of the components in the system. Moreover, these embodiments allow the use of a terminal system comprising separate components, e.g. a set-top box connected to a display terminal for viewing the content in the first stream and a separate multi-media computer for recording the user signal and transmitting the user signal in a second stream to the mixer.

Figure 8:
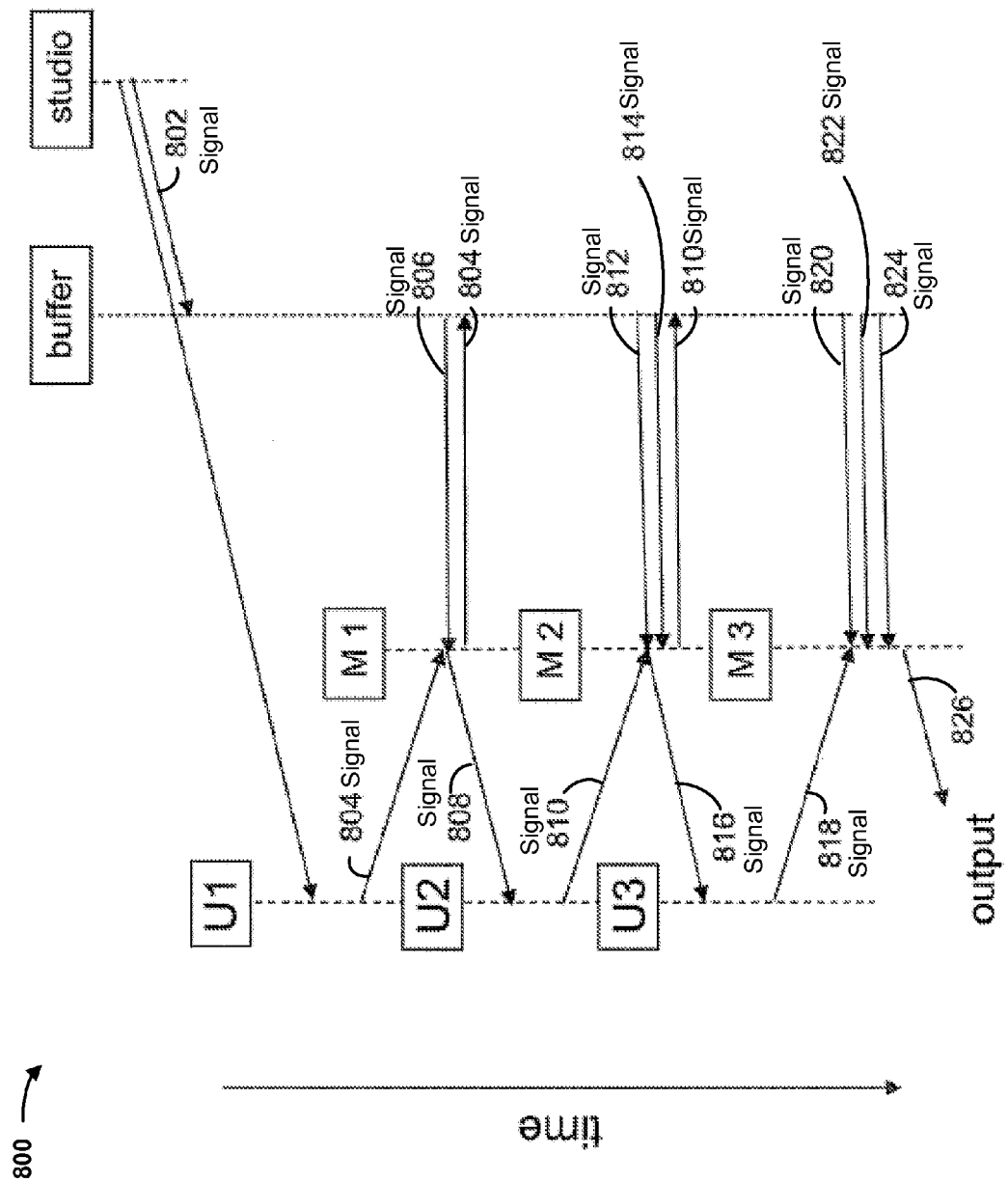
FIG. 8 depicts an embodiment capable of handling multiple participating users.

The invention may be extended to a number of users participating in an interactive broadcast session. In that case, also interactions amongst the participating users have to be taken into account. FIG. 8 illustrates an embodiment of a system 800 which is capable of handling multiple participating viewers. The system comprises a number of terminals (U1,U2,U3, ..., etc.) of participating users. Each terminal has an associated mixer (M1,M2,M3, ..., etc.). The system further comprises a buffer which is capable of buffering the studio signal 802 and the user signals 804,810,816 send from each terminal to its associated mixer. Each mixer receives a user signal and one or more signals from a buffer and produces a substantially synchronized output signal using the temporal relation between the signals as described above in relation with FIGS. 3-7. A substantially synchronized output stream 224 is generated by mixing each user signal one by one into the interactive broadcast session according to steps as described hereunder.

A first video mixer M1 mixes a buffered studio signal 806 with a first user signal 804 into a substantially synchronized first mixed output signal 808. The first user signal 804 is buffered and the first mixed output signal 808—the output signal of the first mixer—is sent to the terminal U2 of the second participating user.

Thereafter, the second user interacts with the first mixed output signal 808 and produces a second user signal 810. The second video mixer M2 mixes the buffered studio signal 812 and the buffered first user signal 814 with the second user signal 810 into a substantially synchronized second mixed output signal 816. The second user signal 810 is buffered and the second mixed output signal 816 is sent to the terminal U2 of the third user.

The third user interacts with the second mixed output signal 816 and produces a third user signal 818 which is sent to a third mixer M3, which mixes this signal together with the buffered television signal 822 and buffered the first and second user signals 822,824 into a substantially synchronized mixed third and final mixed output 826. This output signal is finally transmitted to all other non-participating viewers.

Clearly, when increasing the number of participating viewers to a large number, the method as described in relation with FIG. 8 may become complex. Moreover, in this method user U3 may interact with the mixed signal 816 comprising the signals of U1 and U2 but not vice-versa.

Figure 9:
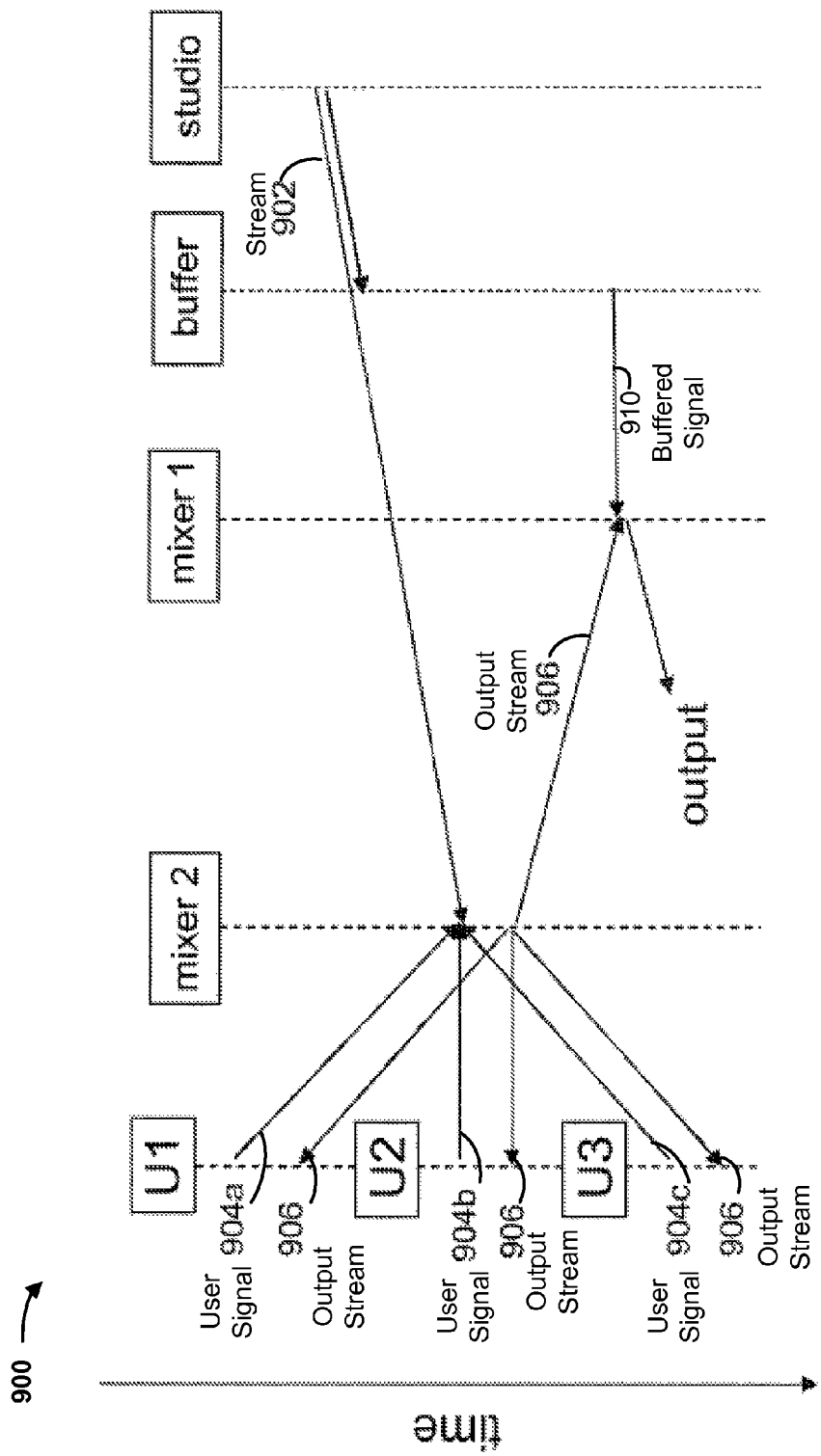
FIG. 9 depicts another embodiment capable of handling multiple participating users.

FIG. 9 illustrates another embodiment of a system 900 which is capable of handling multiple participating viewers. In this embodiment the system comprises in addition to a first mixer, which typically is a high quality video mixer, a further second mixer in the form of a fast video mixer, e.g. a video Multipoint Control Unit (MCU) as described in the article by Liu ("*Image and video coding—A fast video mixing method*", Lecture notes in Computer Science, Vol. 3656, 2005, pp. 320-327), which is incorporated by reference into this application. Such MCU uses mixing techniques, which allows fast and efficient mixing of streams in multiparty videoconferencing systems.

In the embodiment of FIG. 9, copies of a first stream 902 comprising the studio signal are transmitted to a buffer, to a second video mixer and to the terminals of all participating users (U1,U2,U3, ..., etc.). The second mixer subsequently receives all user signals 904a,904b,904c and mixes these signals with the studio signal 902 into a second output stream 906. The second mixer simultaneously transmits the second output signal 906 to all participating users and to the first high quality video mixer. The first mixer mixes the second output stream 906 with the buffered studio signal 910 into a substantially synchronized high-quality first output stream, which is transmitted to all non-participating viewers. Hence, the second fast video mixer allows simultaneous interaction of all participants in the session, wherein the quality of the signals between the participating viewers will be slightly lower than the high quality stream which is sent by the first mixer to the non-participating viewers.

It is to be understood that the use of a second mixer is not limited to this embodiment. In further embodiments for example, the studio signal may be distributed via the fast second mixer, e.g. a MCU, to the user and/or the user signals may be transmitted directly to the first high quality mixer. Further, it is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of generating a stream comprising synchronized content for use in interactive multimedia service, the method comprising:

at a mixer connected to a buffer via a first input of the mixer, receiving a buffered copy of a first stream via the buffer, the first stream being transmitted to both the buffer and over a network to a terminal of a user;

at the mixer, receiving via a second input of the mixer a second stream transmitted from the terminal over a network, the second stream comprising content generated by the user in response to content of the first stream;

providing the mixer with a temporal relation between packets in the first and second streams, wherein providing the mixer with the temporal relation comprises: determining a first time delay between transmission of a first packet in the first stream and receipt by the mixer of a second packet in the second stream, the second packet being transmitted by the terminal in response to the first packet, determining a second time delay between transmission of a copy of the first packet and receipt by the mixer of the copy of the first packet, and relating the first time delay to the second time delay;

at the mixer, generating an output stream comprising a synchronized content by mixing packets in second stream with packets in the buffered first stream based on the temporal relation; and transmitting the output stream for use as an input signal for the interactive multimedia service.

2. The method according to claim 1, wherein providing the mixer with the temporal relation comprises defining a mapping information relating a first packet in the first stream comprising first timing information to a second packet in the second stream comprising second timing information, the first and second timing information comprising time-stamp information.

3. The method according to claim 2, wherein providing the mixer with the temporal relation further comprises:

at the mixer, receiving a mapping signal from the terminal, the mapping signal containing the mapping information based on the first and second timing information.

4. The method according to claim 2, wherein providing the mixer with the temporal relation further comprises providing the mixer with a predetermined mapping scheme that is shared in common with the terminal.

5. The method according to claim 2, further comprising:

associating a second packet in the second stream with a first packet in the first stream based on the mapping information; and mixing the first packet with the second packet.

6. The method according to claim 2, further comprising:

associating a second packet in the second stream with a first packet in the first stream base on the mapping information;

calculating a first buffer delay based on a first arrival time at an input of the buffer of the first packet in the buffered copy of the first stream and a second arrival time at the second input of the mixer of the second packet in the second stream; and mixing the buffered copy of the first stream with a time-delayed version of the second stream, wherein the time-delay is based on the calculated first buffer delay.

7. The method according to claim 1, wherein determining a first time delay between transmission of a first packet in the first stream and receipt by the mixer of a second packet in the second stream comprises determining a first time delay between a predetermined audio signal transmitted in the first stream to the terminal and an associated audio signal transmitted in the second stream to the mixer.

8. The method according to claim 1, further comprising:

generating a time-delayed first stream by providing the first time delay to the buffer; and mixing the second stream with the time-delayed first stream.

9. The method according to claim 1, further comprising:

generating a time-delayed first stream by providing the first time delay to the buffer; and mixing the second stream with the time-delayed first stream.

10. A method of generating a stream comprising synchronized content for use in interactive multimedia service, the method comprising:

at a mixer connected to a buffer, receiving a buffered copy of a first stream via the buffer, the first stream being transmitted to the buffer, over a network to a first terminal of a first user, and to a first-stage mixer;

at the mixer, receiving a second stream from the first terminal;

at the mixer, receiving a third stream from a second terminal of a second user, the third stream comprising content generated based on content of a synchronized output stream transmitted to the second terminal by the first-stage mixer;

providing the mixer with a temporal relation between packets in the synchronized output stream transmitted to the second terminal and packets in the third stream, wherein providing the mixer with the temporal relation comprises: determining a first time delay between transmission of a first packet in the synchronized output stream and receipt by the mixer of a second packet in the third stream, the second packet being transmitted by the second terminal in response to the first packet;

determining a second time delay between transmission of a copy of the first packet and receipt by the mixer of the copy of the first packet; and relating the first time delay to the second time delay.; and at the mixer, generating and transmitting an output stream comprising synchronized content by mixing packets in the second stream with packets in the third stream, and with packets in the buffered first stream based on the temporal relation.

11. A method of generating a stream comprising synchronized content for use in interactive multimedia service, the method comprising:

at a mixer connected to a buffer via a first input of the mixer, receiving a buffered copy of a first stream via the buffer, the first stream being transmitted to both the buffer and over a network to a terminal of a user;

at the mixer, receiving via a second input of the mixer a second stream transmitted from the terminal over a network, the second stream comprising content generated by the user in response to content of the first stream;

providing the mixer with a temporal relation between packets in the first and second streams, wherein providing the mixer with the temporal relation comprises defining a mapping information relating a first packet in the first stream comprising first timing information to a second packet in the second stream comprising second timing information, the first and second timing information comprising time-stamp information;

associating a second packet in the second stream with a first packet in the first stream based on the mapping information;

calculating a first buffer delay based on a first arrival time at an input of the buffer of the first packet in the buffered copy of the first stream and a second arrival time at the second input of the mixer of the second packet in the second stream;

mixing the buffered copy of the first stream with a time-delayed version of the second stream, wherein the time-delay is based on the calculated first buffer delay;

at the mixer, generating an output stream comprising a synchronized content by mixing packets in second stream with packets in the buffered first stream based on the temporal relation; and transmitting the output stream for use as an input signal for the interactive multimedia service.

12. The method according to claim 11, wherein providing the mixer with the temporal relation further comprises:
at the mixer, receiving a mapping signal from the terminal, the mapping signal containing the mapping information based on the first and second timing information.

13. The method according to claim 11, wherein providing the mixer with the temporal relation further comprises providing the mixer with a predetermined mapping scheme that is shared in common with the terminal.

14. The method according to claim 11, further comprising mixing the first packet with the second packet.

15. A method of generating a stream comprising synchronized content for use in interactive multimedia service, the method comprising:
transmitting a first stream over one or more networks to a terminal of a user,
transmitting a copy of the first stream to a buffer, thereby creating a buffered first stream, the buffer being connected to a first input of a mixer;
transmitting in response to receipt of the first stream, a second stream over one or more networks to a second input of the mixer, the second stream comprising content generated by the user in response to content of the first stream;
providing the mixer with a temporal relation between packets in the first and second streams, wherein providing the mixer with the temporal relation between packets in the first and second streams comprises: determining a first time delay between transmission of a first packet in the first stream and receipt by the mixer of a second packet in the second stream, determining a second time delay between transmission of the copy of the first packet and receipt by the mixer of the copy of the first packet, and relating the first time delay to the second time delay; and
generating an output stream comprising a synchronized content by mixing packets in the second stream with packets of the buffered first stream based on the temporal relation, wherein the output stream is used as an input signal for the interactive multimedia service.

16. A system for generating a stream comprising synchronized content, the system being configured for providing an interactive multimedia service, and the system comprising:
at least one studio transmitter configured for transmitting a first stream over one or more networks to one or more terminal systems and for transmitting a copy of the first stream to a buffer to create a buffered first stream;
at least one terminal system configured for:
receiving the first stream,
generating in response to reception of the first stream a second stream, and
transmitting the second stream over one or more networks to a mixer, the second stream comprising content generated by the user in response to content of the first stream; and
a mixer configured for:
providing a temporal relation between packets in the first stream and packets in the second stream, wherein providing the temporal relation comprises: determining a first time delay between transmission of a first packet in the first stream and receipt by the mixer of a second packet in the second stream, determining a second time delay between transmission of a copy of the first packet and receipt by the mixer of the copy of the first packet, and relating the first time delay to the second time delay, and
generating a first output stream, the mixer comprising a first input for receiving packets from the buffered first stream and a second input for receiving packets from the second stream, the first output stream comprising a synchronized content generated by mixing packets in the second stream with packets of the buffered first stream according to the temporal relation, wherein the first output stream is used as an input signal for the interactive multimedia service.

17. A video mixer comprising:
a first input for receiving a first stream from a buffer, wherein the first stream originates from a studio transmitter;
a second input for receiving a second stream, wherein the second stream originates from a terminal of a user, and wherein the second stream comprises content generated by the user in response to content of the first stream,
wherein the video mixer is configured to obtain a temporal relation between a first packet in the first stream received from the buffer and second packet in the second stream, wherein the temporal relation is established by: determining a first time delay between transmission of a first packet in the first stream and receipt by the video mixer of a second packet in the second stream, determining a second time delay between transmission of a copy of the first packet and receipt by the mixer of the copy of the first packet, and relating the first time delay to the second time delay,
wherein the video mixer is further configured to generate an output stream comprising a synchronized content by mixing packets in second stream with packets of the buffered first stream based on the temporal relation; and
wherein the video mixer is further configured to transmit the output stream to the studio transmitter.

18. A method of generating a stream comprising synchronized content for use in interactive multimedia service, the method comprising:
transmitting a first stream over one or more networks to a terminal of a user,
transmitting a copy of the first stream to a buffer, thereby creating a buffered first stream, the buffer being connected to a first input of a mixer;
transmitting in response to receipt of the first stream, a second stream over one or more networks to a second input of the mixer, the second stream comprising content generated by the user in response to content of the first stream;
providing the mixer with a temporal relation between packets in the first and second streams, wherein providing the mixer with the temporal relation comprises defining a mapping information relating a first packet in the first stream comprising first timing information to a second packet in the second stream comprising second timing information, the first and second timing information comprising time-stamp information;
associating a second packet in the second stream with a first packet in the first stream based on the mapping information;
calculating a first buffer delay based on a first arrival time at an input of the buffer of the first packet in the buffered copy of the first stream and a second arrival time at the second input of the mixer of the second packet in the second stream;
mixing the buffered copy of the first stream with a time-delayed version of the second stream, wherein the time-delay is based on the calculated first buffer delay; and generating an output stream comprising a synchronized content by mixing packets in the second stream with packets of the buffered first stream based on the temporal relation, wherein the output stream is used as an input signal for the interactive multimedia service.

19. A system for generating a stream comprising synchronized content, the system being configured for providing an interactive multimedia service, and the system comprising:
at least one studio transmitter configured for transmitting a first stream over one or more networks to one or more terminal systems and for transmitting a copy of the first stream to a buffer to create a buffered first stream;
at least one terminal system configured for:
receiving the first stream,
generating in response to reception of the first stream a second stream, and
transmitting the second stream over one or more networks to a mixer, the second stream comprising content generated by the user in response to content of the first stream; and
a mixer configured for:
providing a temporal relation between packets in the first stream and packets in the second stream, wherein providing the temporal relation comprises defining a mapping information relating a first packet in the first stream comprising first timing information to a second packet in the second stream comprising second timing information, the first and second timing information comprising time-stamp information,
associating a second packet in the second stream with a first packet in the first stream based on the mapping information;
calculating a first buffer delay based on a first arrival time at an input of the buffer of the first packet in the buffered copy of the first stream and a second arrival time at the second input of the mixer of the second packet in the second stream; and
mixing the buffered copy of the first stream with a time-delayed version of the second stream, wherein the time-delay is based on the calculated first buffer delay, and
generating a first output stream, the mixer comprising a first input for receiving packets from the buffered first stream and a second input for receiving packets from the second stream, the first output stream comprising a synchronized content generated by mixing packets in the second stream with packets of the buffered first stream according to the temporal relation, wherein the first output stream is used as an input signal for the interactive multimedia service.

20. A video mixer comprising:
a first input for receiving a first stream from a buffer, wherein the first stream originates from a studio transmitter;
a second input for receiving a second stream, wherein the second stream originates from a terminal of a user, and wherein the second stream comprises content generated by the user in response to content of the first stream,
wherein the video mixer is configured to obtain a temporal relation between a first packet in the first stream received from the buffer and second packet in the second stream, wherein the temporal relation is established by: defining a mapping information relating a first packet in the first stream comprising first timing information to a second packet in the second stream comprising second timing information, the first and second timing information comprising time-stamp information,
wherein the video mixer is further configured to associate a second packet in the second stream with a first packet in the first stream based on the mapping information,
wherein the video mixer is further configured to calculate a first buffer delay based on a first arrival time at an input of the buffer of the first packet in the buffered copy of the first stream and a second arrival time at the second input of the mixer of the second packet in the second stream,
wherein the video mixer is further configured to mix the buffered copy of the first stream with a time-delayed version of the second stream, wherein the time-delay is based on the calculated first buffer delay;
wherein the video mixer is further configured to generate an output stream comprising a synchronized content by mixing packets in second stream with packets of the buffered first stream based on the temporal relation, and
wherein the video mixer is further configured to transmit the output stream to the studio transmitter.

* * * * *

UNITED STATES PATENT AND TRADEMARK OFFICE
CERTIFICATE OF CORRECTION

PATENT NO. : 8,296,815 B2
APPLICATION NO. : 12/496827
DATED : October 23, 2012
INVENTOR(S) : Stokking et al.

It is certified that error appears in the above-identified patent and that said Letters Patent is hereby corrected as shown below:

On the title page, Item (73) Assignee: please add the Assignee -- Nederlandse Organisatie Voor Toegepast-Natuurwetenschappelijk Onderzoek TNO, Delft (NL) --.

Signed and Sealed this
Sixteenth Day of April, 2013

Teresa Stanek Rea
*Acting Director of the United States Patent and Trademark Office*